April 2, 1968    A. BROWN ET AL    3,375,729
LUBRICANTS
Filed April 30, 1965
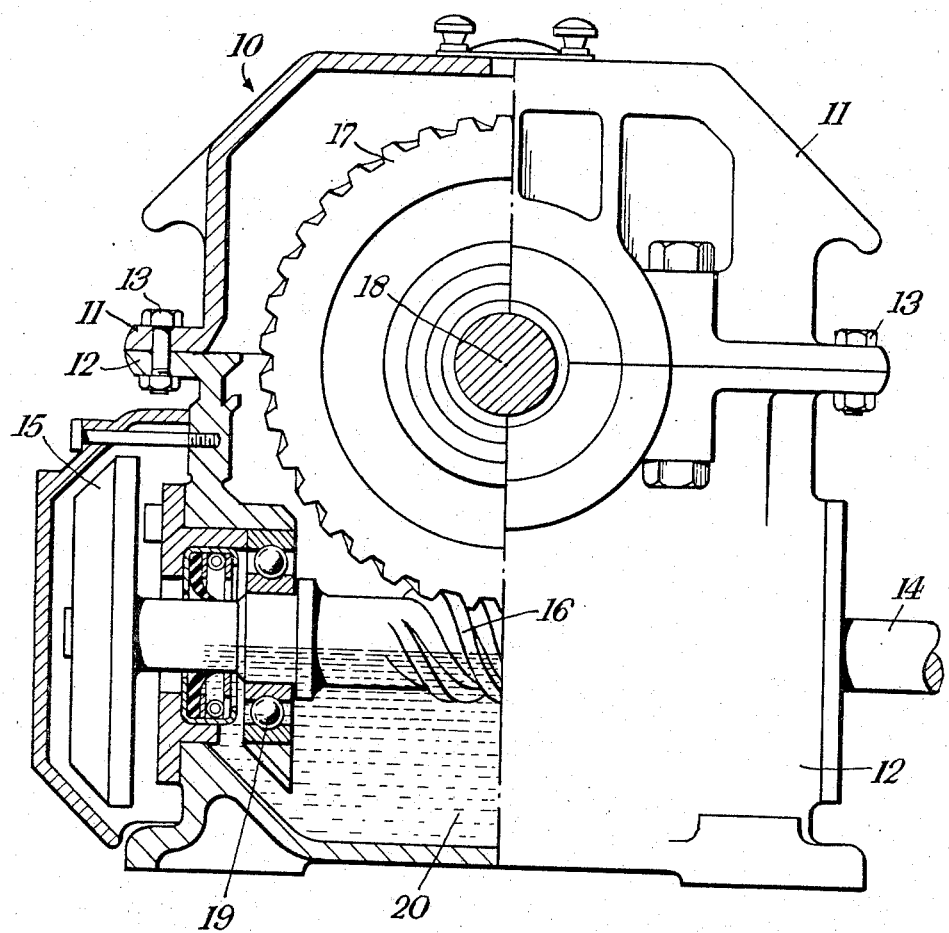

United States Patent Office 3,375,729
Patented Apr. 2, 1968

3,375,729
LUBRICANTS
Alexander Brown, Goff's Oak, and Harold John Wellard, Sawbridgeworth, England, assignors to Murex Welding Processes Limited, Waltham Cross, England, a British company
Filed Apr. 30, 1965, Ser. No. 452,237
7 Claims. (Cl. 74—467)

ABSTRACT OF THE DISCLOSURE

A bearing surface or gear box having cooperating bearing surfaces provided with a lubricant for the bearing surface. The lubricant is a fluid aqueous solution of potassium or sodium silicate and can include a thickening agent and a corrosion inhibitor.

---

The invention relates to the lubrication of bearings or gear boxes in which a steel bearing or meshing surface is in contact with a cooperating surface of steel or bronze, and aims to provide efficient lubrication under conditions of extreme load or high temperature which cause rapid and severe breakdown of conventional lubricating oils.

For effective lubrication, and in particular when conditions of extreme pressure are to be encountered, a lubricant is required which will form strong chemical bonds between the lubricant and the metal to provide a film which will not break down at high pressure and/or temperature. In the case of conventional lubricants this film normally consists of a metallic soap, sulphide or chloride.

The invention provides a bearing or gear box having cooperating bearing or meshing surfaces, both of which are of steel or one of which is of steel and the other of bronze, and which includes, as a lubricant for the bearing or meshing surfaces, a fluid aqueous solution of sodium and/or potassium silicate. It is to be understood that the bearing surfaces may be either sliding or rotary.

In the bearing or gear box according to the invention the lubricating film consists of a metal silicate formed by the reaction of the sodium or potassium silicate with the metal of the cooperating surfaces or with an oxide film present on said surfaces. We have found that this metal silicate provides a film which remains stable at a considerably higher temperature than can be achieved with conventional lubricants. It is important that the reactivity of the lubricant with the metal of the surfaces should be sufficient to form and maintain the required protective film but the lubricant must not in a long application be too reactive otherwise chemical corrosion may occur. Suitable lubricating silicate films may be obtained from aqueous solutions of sodium silicate in which the molar ratio of $SiO_2$ to $Na_2O$ is from 1.6:1 to 4:1 and from aqueous solutions of potassium silicate in which the molar ratio of $SiO_2$ to $K_2O$ is from 1.4:1 to 4:1. Mixtures of such solutions may also be used. The silicate solution should not, of course, be so concentrated as to become a glass, nor may the concentration be too low. The silicate content of the solution may be as high as 60% by weight, provided the molar ratio of silica to alkali metal oxide or oxides is not too high. The minimum solids content should not generally be below 15% by weight.

The solution may contain a thickening agent if it is desired that it should have greasy properties. Examples of suitable thickening agents are sodium alginate, a gum such as gum arabic, gum karaya or gum guar or another silicate, such as calcium silicate, magnesium silicate, or aluminium silicate. The amount of thickening agent included may be up to 10% by weight of the solution.

The natural reactivity between the sodium or potassium silicate and the moving surfaces will be sufficient in the majority of cases to form the required silicate film. To control this reactivity the solution may also contain a corrosion inhibitor, e.g., in an amount up to 2% by weight. This may be of the oxidising type, e.g., sodium chromate, sodium nitrite or sodium nitrate or of the "large ion type," e.g., sodium benzoate or sodium phosphate. In some particular applications it may prove beneficial to increase the reactivity between the sodium or potassium silicate and the metal surface by the addition of corrosion accelerators, e.g., sodium or potassium chloride, sulphate or carbonate.

The silicate solution used as the lubricant may also contain, for the purpose of reducing to a minimum the coefficient of friction between the lubricated surfaces, 0.25–10% by weight of molybdenum disulphide or 0.25–12% by weight of graphite, or a mixture of these additives in an amount of 0.25–12% by weight.

In one test which we have made a mixture of two silicate solutions was used, these being identified as C100 and K120, and the mixture contained sodium alginate in the proportion indicated below. The amounts in parts by weight of the ingredients of the two solutions were as follows:

C100:
$Na_2O$ _____ 14.0
$SiO_2$ _____ 28.1
$H_2O$ _____ 57.9
Specific gravity _____ 1.5

K120:
$K_2O$ _____ 21.3
$SiO_2$ _____ 30.5
$H_2O$ _____ 48.2
Specific gravity _____ 1.6

6 parts by volume of C100, 5 parts by volume of K120 and 5 parts by volume of water were mixed and 2.5 gm. of sodium alginate were added per 30 ml. of the mixture.

A mixture of this formulation was tested by a Seta-Shell 4 Ball Extreme Pressure Lubricant Testing Machine under a loading of 680 kg. and the machine ran without seizure for 1 minute. When a conventional high pressure lubricating oil was tested under the same loading, seizure occurred after 10 seconds. Still better results were obtained when a test was made on the above described mixture of C100 and K120 without addition of sodium alginate.

The above-mentioned machine contains three balls of diameter ½" held captive and immovable in a cage containing the lubricant, and another ball of the same diameter, mounted on a vertical shaft rotated at high speed by an electric motor, is pressed into contact with the three captive balls under a desired load. In wear tests the average diameter of the circular scars made by the rotating ball on the captive balls after the rotating ball had been run for one minute at 1400 r.p.m. under a load of 240 kg. were measured.

The following values of scar diameter were measured in comparative tests between GP90, a conventional Shell lubricating oil, C100 the sodium silicate solution identified above, and A140 which was a silicate solution of the following composition in parts by weight:

$Na_2O$, 18%; $SiO_2$, 36%; $H_2O$, 46%; specific gravity, 1.7.

| Lubricant: | Average diameter of scar in cm. |
|---|---|
| GP90 | 0.38 |
| C100 | 0.21 |
| A140 | 0.14 |
| Mixture of 3 parts by volume of A140 and 1 part of water | 0.17 |
| Mixture of 3 parts by volume of C100 and 1 part of water | 0.22 |

The use for lubrication purposes of the above described silicate films derived from silicate solutions has a number of advantages. In addition to the outstanding lubricating properties obtained from the film the solutions are readily compatible with water soluble corrosion inhibitors, they are chemically stable, they are not so liable as lubricating oils to decomposition in use to yield corrosive substances, they do not attack rubber and they are based on materials indigenous to the United Kingdom. The high specific heat and the high latent heat of the alkali silicate solution helps to prevent local overheating. The silicate film at the lubricating boundary is much less sensitive to high temperatures than that derived from oils or the soaps which are conventionally added to such oils in order to obtain extreme pressure lubricating properties.

The following are examples, parts being by weight, of lubricant solutions containing molybdenum disulphite and graphite:

A140 solution, 95%; graphite, 5%.
A140 solution, 96%; graphite, 2%; $MoS_2$, 2%.
C100 solution, 97% $NaNO_2$, 1%; $MoS_2$, 2%.

An example of this invention comprises a gear box employing spur, helical, worm or hypoid bevel gears, containing a lubricant formulated as set out above and preferably sealed to prevent loss of water by evaporation.

A second typical example comprises an automotive transmission of the worm or hypoid type in which advantage is taken of the self sealing properties of the formulations above described. By this we mean that should a slight leak occur either at a seal or as a result of insufficiently tight bolts or for some other causes as frequently arises in service conditions the lubricant, in contrast to the conventional lubricating oils, will form a resistant film at the point of leakage thereby rapidly and effectively preventing any further loss of lubricant.

In the drawing, the single figure is a view partly in side elevation and partly in vertical section of a typical automotive transmission in which the lubricant composition of the present invention may be used.

The transmission is enclosed within a casing 10, comprising upper and lower portions 11, 12 united by bolts 13, and includes a driving shaft 14, driven by a gear 15, and carrying a helical gear 16 which meshes with a helical gear 17 on a driven shaft 18. The shaft 14 is supported in bearings, one of which is shown at 19, which are lubricated by a silicate lubricant solution 20 contained in the casing 10.

What we claim as our invention and desire to secure by Letters Patent is:

1. The combination with relatively movable parts having a metallic bearing surface requiring lubrication, of a lubricating film on said bearing surface, said lubricating film consisting of a metal silicate formed by the reaction of an aqueous solution of a member selected from the group consisting of sodium silicate and potassium silicate with said metal bearing surface.

2. The combination of claim 1 wherein the aqueous solution is a solution of sodium silicate containing 15–60% by weight of sodium silicate having a molar ratio of $SiO_2$ to $Na_2O$ of 1.6:1 to 1.4:1.

3. The combination of claim 1 wherein the aqueous solution is a solution of potassium silicate containg 15–60% by weight of potassium silicate having a molar ratio of $SiO_2$ to $K_2O$ of 1.4:1 to 4:1.

4. The combination of claim 1 wherein said aqueous solution contains up to 10% by weight of a thickening agent.

5. The combination of claim 1 wherein said aqueous solution contains up to 2% by weight of a corrosion inhibitor.

6. The combination of claim 1 wherein the aqueous solution contains in the amounts indicated a member selected from the group consisting of 0.25–10% by weight of molybdenum disulphide, 0.25–12% by weight of graphite and 0.25–12% by weight of a mixture of molybdenum disulphide and graphite.

7. The combination of a gear box having cooperating metallic bearing surfaces requiring lubrication, said metallic surfaces being selected from the group consisting of steel and bronze with the proviso that at least one metallic surface is steel, of a lubricating film on said bearing surfaces, said lubricating film consisting of a metal silicate formed by the reaction of an aqueous solution of a member selected from the group consisting of sodium silicate and potassium silicate with said metallic bearing surfaces.

References Cited

UNITED STATES PATENTS

| | | | |
|---|---|---|---|
| 2,114,982 | 4/1938 | Jackson | 74—425 X |
| 2,388,863 | 11/1945 | Noble | 74—425 |
| 2,641,139 | 6/1953 | Beisner | 74—425 |
| 2,901,380 | 8/1959 | Crump | 308—241 |
| 2,968,999 | 1/1961 | Breton | 252—49.5 X |
| 3,079,204 | 2/1963 | Lamson et al. | 308—241 X |
| 3,244,625 | 4/1966 | Silwones. | |
| 3,249,538 | 5/1966 | Freier | 252—49.3 X |

FOREIGN PATENTS

| | | |
|---|---|---|
| 453,157 | 12/1948 | Canada. |
| 622,742 | 6/1961 | Canada. |

DONLEY J. STOCKING, *Primary Examiner.*

DAVID J. WILLIAMOWSKY, *Examiner.*

ROBERT M. WALKER, L. H. GERIN,
*Assistant Examiners.*